J. NEAL.
GATE LATCHING DEVICE.
APPLICATION FILED FEB. 28, 1917.
1,240,242.
Patented Sept. 18, 1917.
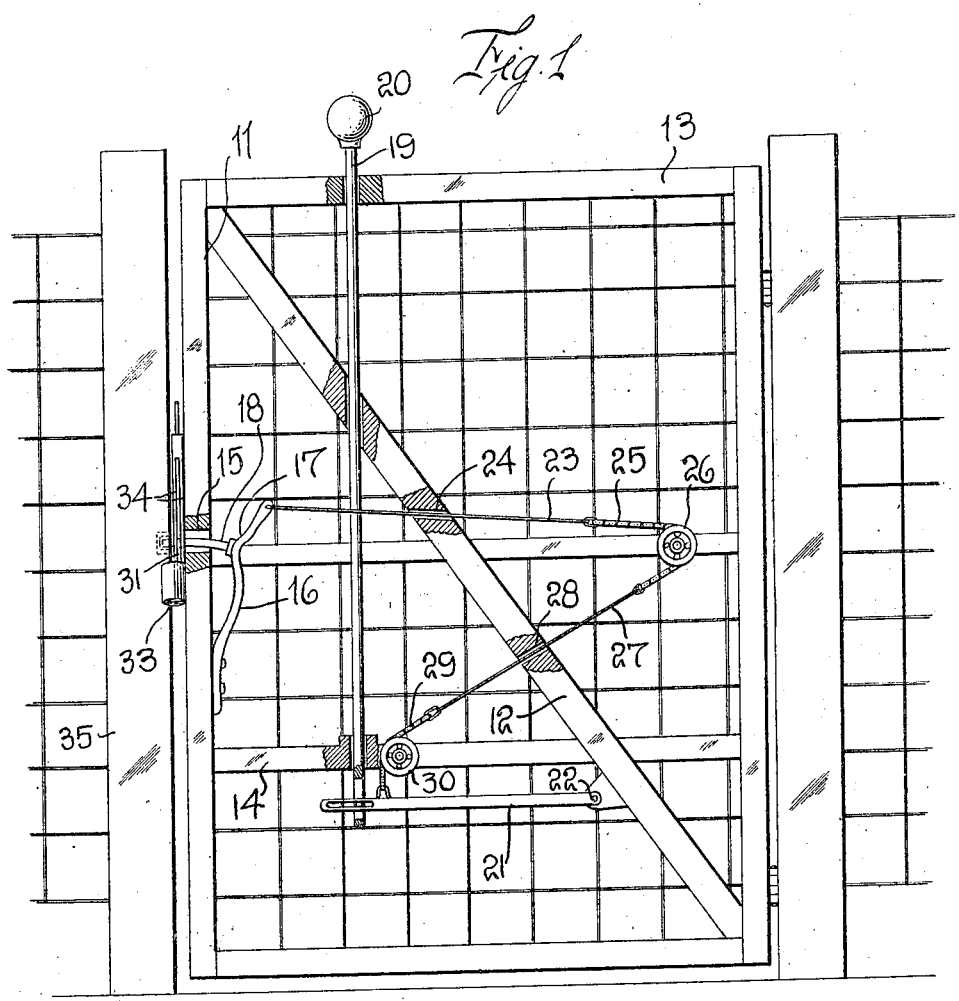
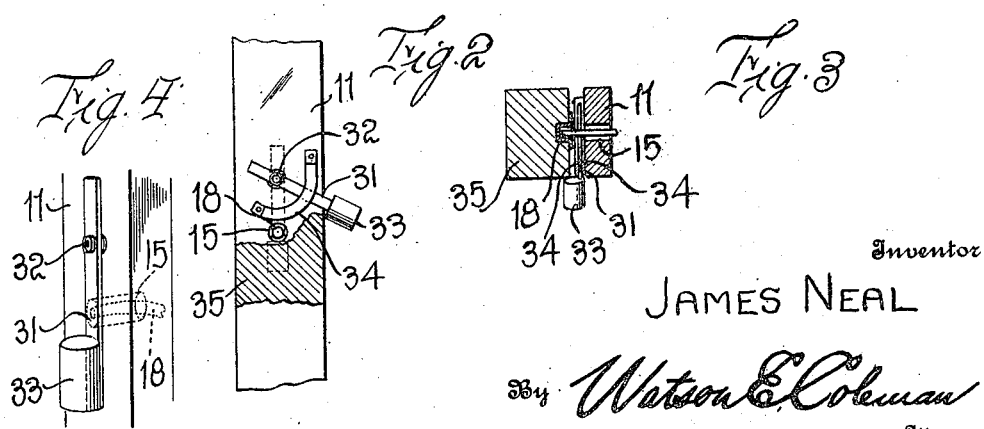
Inventor
JAMES NEAL

UNITED STATES PATENT OFFICE.

JAMES NEAL, OF PHOENIX, ARIZONA.

GATE-LATCHING DEVICE.

1,240,242. Specification of Letters Patent. Patented Sept. 18, 1917.

Application filed February 28, 1917. Serial No. 151,519.

*To all whom it may concern:*

Be it known that I, JAMES NEAL, a citizen of the United States, residing at Phoenix, in the county of Maricopa and State of Arizona, have invented certain new and useful Improvements in Gate-Latching Devices, of which the following is a specification, reference being had to the accompanying drawings.

This invention relates to gates and particularly to latching devices therefor. The general object of my invention is the provision of a latching device including a normally projected locking or latching member and manually operable means for retracting the member so as to permit the gate to be swung.

A further object is to provide in connection with the construction stated above, means for engaging the latching bolt or pin when it is retracted and holding it in its retracted position until the gate has swung back into contiguity with the gate post, whereupon the means will be shifted out of the way of the locking pin or bolt and the bolt projected into engagement with the gate post.

Other objects will appear in the course of the following description.

My invention is illustrated in the accompanying drawings, wherein—

Figure 1 is a front elevation of a gate with my latching device applied thereto, the bars of the gate being partly in section;

Fig. 2 is a front view of the bar 11 partly broken away and showing in full lines the latch or keeper 31 turned to its inoperative position, and in dotted lines the member 31 in its operative position;

Fig. 3 is a transverse sectional view through a gate post and the bar 11, the section being taken on the line intersecting the opening 15 and showing the gate latched;

Fig. 4 is a fragmentary perspective view of the bar 11 showing the position of the member 31 when the gate is swung open.

Referring to these drawings, 10 designates generally a gate which may be framed in any suitable manner and includes the vertical bar 11 at the free edge of the gate, the downwardly and rearwardly extending bar 12 and the horizontal upper bar 13 together with a horizontal lower bar 14 which extends from the front bar 11 to the diagonal bar 12. All these parts of the gate may be put together in any suitable manner.

The front bar 11 is formed with an opening 15 and mounted upon the front bar below this opening is a spring 16 which extends upward, then is bowed slightly outward as at 17, and then extends further outward. Coacting with this spring and operatively connected thereto in any suitable manner is a locking pin 18 which normally projects through the opening 15.

The upper bar 13, the diagonal bar 12, and the lower bar 14 are all perforated for the passage of a vertical rod 19 having a knob or rod 20 at its upper end. This rod is pivotally connected at its lower end with a link 21 which in turn is pivotally connected as at 22 to the diagonal bar 12. Attached to the free end of the spring 16 is a rod 23 which extends through a perforation 24 in the diagonal bar 12 and is attached to a length of chain 25 passing over a pulley 26 attached in any suitable way to the frame of the gate. The chain 25 in turn is connected to a rod 27 extending downward and forward through a perforation 28 in the bar 12 and at its lower end connected to a chain 29 passing over a pulley 30 mounted upon the lower bar 13. The chain then extends down and is attached to the forward free end of the link 21.

Mounted upon the front face of the vertical bar 11 forming the front edge of the gate is a latch or keeper 31 which is pivoted adjacent its upper end as at 32 and has a weight 33 at its lowest end, this weight projecting outward so that the gate post is in the path of movement of this enlarged lower end. Normally the latch or keeper 32 extends down over the opening 15 and will prevent the projection of the pin 18. This pivoted latch 32 passes between arcuate guide strips 34.

The operation of this invention will be obvious from what has gone before. Normally the pin 18 is projected through the opening 15 and engages in a suitable keeper in the fence post. If it be now desired to open the gate, the rod 19 is depressed which moves the link 21 downward, pulls upon the connections 27, 25 and 23, pulls the upper free end of the spring 16 rearward, retracting the pin, and the gate may then be shifted to its open position. As the pin is retracted and the gate is shifted, the latch member 32 drops downward in front of the perforation 15 and holds the pin in its retracted position as in Fig. 4. Now when the gate is shifted back to its closed position, the gate post 35 will strike the projecting portion 33 of the member 32 and will turn the member to the position shown in full lines in Fig. 2, permitting the bolt to be projected into engagement with the fence post. The latch is very simple and convenient in practice, can be used in many situations and can be made ornamental. It will be seen that the device which I have provided automatically holds the latch bolt in its retracted position while the gate is out of alinement with the gate post but that as soon as the gate swings into alinement with the gate post, the latch bolt will be automatically projected. It will likewise be seen that the latching bolt cannot be retracted unless the operating rod 19 is shifted.

While I have illustrated a form of my invention which I believe to be particularly advantageous, it will be understood that many changes may be made in the construction within the scope of the appended claims without departing from the spirit thereof.

Having described my invention, what I claim is:

1. The combination with a gate and a gate post, of a spring actuated bolt extending through a perforation in the front bar of the gate post, manually operable means for retracting the bolt, and means for holding the bolt retracted when the gate is swung away from the gate post comprising a latch pivoted at its upper end, normally extending over said perforation and having a weight at its lower end, the weight extending outward and adapted to be engaged by the gate post when the gate is closed and thereby shifted away from a position over the perforation through which the bolt passes.

2. The combination with a gate and a gate post, of a flat spring attached to the frame of the gate and extending upward and rearward, a latching bolt operatively connected to the spring, the front bar of the gate being formed with a perforation through which the latching bolt passes, a vertically depressible actuating member mounted upon the frame of the gate, a link pivotally supporting the lower end of said member, pulleys and a flexible connection attached at one end to the spring passing around said pulleys and at its other end attached to said link whereby upon a depression of the actuating member the bolt will be retracted, and means for holding the bolt retracted while the gate is out of alinement with the gate post but automatically releasing said bolt when the gate is in alinement with the gate post.

3. The combination with a gate and a gate post, of a flat spring attached to the frame of the gate and extending upward and rearward, a latching bolt operatively connected to the spring, the front bar of the gate being formed with a perforation through which the latching bolt passes, a vertically depressible actuating member mounted upon the frame of the gate, a link pivotally supporting the lower end of said member, pulleys, and a flexible connection attached at one end of the spring passing around the pulleys and at its other end attached to said link, whereby upon a depression of the actuating member the bolt will be retracted.

In testimony whereof I hereunto affix my signature in the presence of two witnesses.

JAMES NEAL.

Witnesses:
SAM. SMITH,
RAY LUCAS.

Copies of this patent may be obtained for five cents each, by addressing the "Commissioner of Patents, Washington, D. C."